United States Patent [19]

Olsen

[11] 4,071,068
[45] Jan. 31, 1978

[54] REMOVABLE TRACK BELT WITH REMOVABLE KEEPER BAR

[75] Inventor: Richard J. Olsen, Massillon, Ohio

[73] Assignee: The Goodyear Tire & Rubber Company, Akron, Ohio

[21] Appl. No.: 646,621

[22] Filed: Jan. 5, 1976

[51] Int. Cl.² .......................................... B60C 11/02
[52] U.S. Cl. ...................................... 152/176; 305/38
[58] Field of Search ................ 305/19, 35 EB, 38, 54; 152/175, 176, 187, 188, 193, 194, 198, 199; 74/422, 443

[56] References Cited

U.S. PATENT DOCUMENTS

| | | | |
|---|---|---|---|
| 3,541,873 | 11/1970 | Wolf et al. | 74/443 X |
| 3,776,291 | 12/1973 | Boggs | 305/19 X |
| 3,851,931 | 12/1974 | Crisafulli | 305/54 |
| 3,857,617 | 12/1974 | Grawey | 305/38 |
| 3,871,720 | 3/1975 | Mosshart et al. | 305/54 X |
| 3,897,814 | 8/1975 | Grawey | 152/175 X |
| 3,899,220 | 8/1975 | Grawey et al. | 305/19 |

*Primary Examiner*—Robert B. Reeves
*Assistant Examiner*—John P. Shannon
*Attorney, Agent, or Firm*—F. W. Brunner

[57] ABSTRACT

A removable track belt for installation around the outer surface of a tire carcass has on its inner surface a plurality of circumferential lands and grooves that interlock with lands and grooves on the tire carcass. The inner surface of the track belt also has a plurality of spaced axial grooves for receiving removable rigid keeper bars, to which grousers are attached. The underside of each keeper bar contains lands and grooves that also mate with those of the tire carcass.

23 Claims, 8 Drawing Figures

REMOVABLE TRACK BELT WITH REMOVABLE KEEPER BAR

BACKGROUND OF THE INVENTION

This invention relates generally to tires having removable track belts, and more particularly to such tires for use on heavy off-road equipment.

Removable belts containing tire treads have been developed to some extent for use on light-duty tires, such as for automobile and trucks. Little development has been done, however, with the use of this concept with heavy tires such as those used in off-road service. Such heavy tires are subjected to a great deal of abuse. Great weights are carried at relatively high speeds. Grouser bars are installed to provide the necessary traction. All elements of the tire are subject to damage and failure. While the prior art may have considered the possibility of utilizing replaceable tread or track belts on off-road tires, the requirements of such a tire are clearly not provided in the prior art.

SUMMARY OF THE INVENTION

It is the principal object of this invention to overcome the deficiencies present in prior art devices of this general type.

Another object of this invention is to provide a removable track belt with removable keeper bars.

Another object of this invention is to provide removable keeper bars that are easily installed in a removable track belt and that are themselves interlocked with the tire carcass.

A further object of this invention is to provide removable keeper bars that have a large amount of clearance from the tire carcass sidewalls.

The removable track belt keeper bars to be described are adaptable for use with tire carcasses of any construction; bias, bias-belted, or radial. The tire carcass can be of open or closed design. The tire carcass can also be of virtually any aspect ratio, up to a maximum of 0.70. However, the aspect ratio preferably is between 0.40 and 0.55. The term aspect ratio means the ratio of radial height of the tire carcass to the maximum width, the radial height being measured from a tangent to the radially innermost surface of the smallest diameter bead cores to a tangent to the radially outermost point on the carcass plies, the width being measured between opposite points of the cord reinforcing structure that extends from bead to bead.

The orientation of all elements in the following description is referenced to the axis about which the tire rotates.

A tire constructed in accordance with the teachings of this invention comprises a tire carcass, a removable track belt, a plurality of removable keepers, and a plurality of removable tread lugs, grousers or the like. The tire carcass is equipped on its outer peripheral surface with a pattern of lands and grooves, or the like. The track belt comprises a rubber belt matrix having on its inner surface a complementary pattern, which interacts with that on the tire carcass to anchor the belt to the carcass. The inner surface of the track belt matrix is broken by a plurality of axially oriented recesses for receiving the removable keeper bars. Each keeper bar has a lower surface upon which is formed the same pattern of lands and grooves or the like that is present on the inner surface of the removable track belt, so that the keepers also interlock with the tire carcass. This pattern can be formed in the keeper itself, or can be formed upon a separate strip of rubber or other material, which is attached to the lower surface of the keeper. The ends of the keeper bars extend axially outwardly of the track belt, and are equipped with means for attaching tread lugs, grouser bars or the like, thereto. These outer ends equipped with an attaching portion which has an upper surface lying substantially flush with the outer surface of the track belt at the points where the grousers are mounted. The cross-sectional configuration of the keeper bars define a central channel in which the removable track belt is received. The grousers, or both keeper bars and the grousers, can extend axially outwardly to a distance equal to or greater than the outwardly extension of the sidewalls of the inflated and loaded carcass. This protects the sidewalls somewhat from impact with rocks or the like, and can be done on one or both sides of the tires. It is especially advantageous when a radial tire carcass is used.

An inextensible belt of wire or the like is advantageously integrally formed in the belt matrix, located radially outwardly of the recesses within which the keeper bars are received. The track belt has an outer surface upon which lugs, grouser bars or the like can be positioned. The pressure in the inflated carcass serves to press it against the track belt and the keeper bars, as well as to stabilize the keeper bars. All of the additional virtues of such an inextensible belt are also thus present in the tires.

The advantages of the above described structure are many. Since the keeper bars are easily removed, a broken keeper bar can be replaced without discarding the entire removable track belt. Replacement of a keeper bar is uncomplicated, and can be quickly accomplished, even without removing the tire from the vehicle. The manufacture of the removable track belt is simplified, because the keeper bars are not a part of the belt, and thus there is no requirement for setting the keeper bars in a belt mold. The completed track belts are more easily packaged and shipped. The keeper bar is in intimate interlocking contact with the tire carcass, and thus it is held in position directly, rather than by means of the track belt. The system also allows keeper bars of different design characteristics to be used with the same tread belt, to accommodate various types of traction improving devices or attachment means therefor. When a keeper bar is used that has S-shaped upwardly curved end portions, a large clearance is provided between the keeper bars and the tire carcass sidewall. This minimizes the chances of contact between the two under situations of extreme distortion of the tire carcass. It is especially valuable when the tire carcass is of radial construction, which has very flexible sidewalls.

DESCRIPTION OF THE PREFERRED EMBODIMENT

Figure 1:
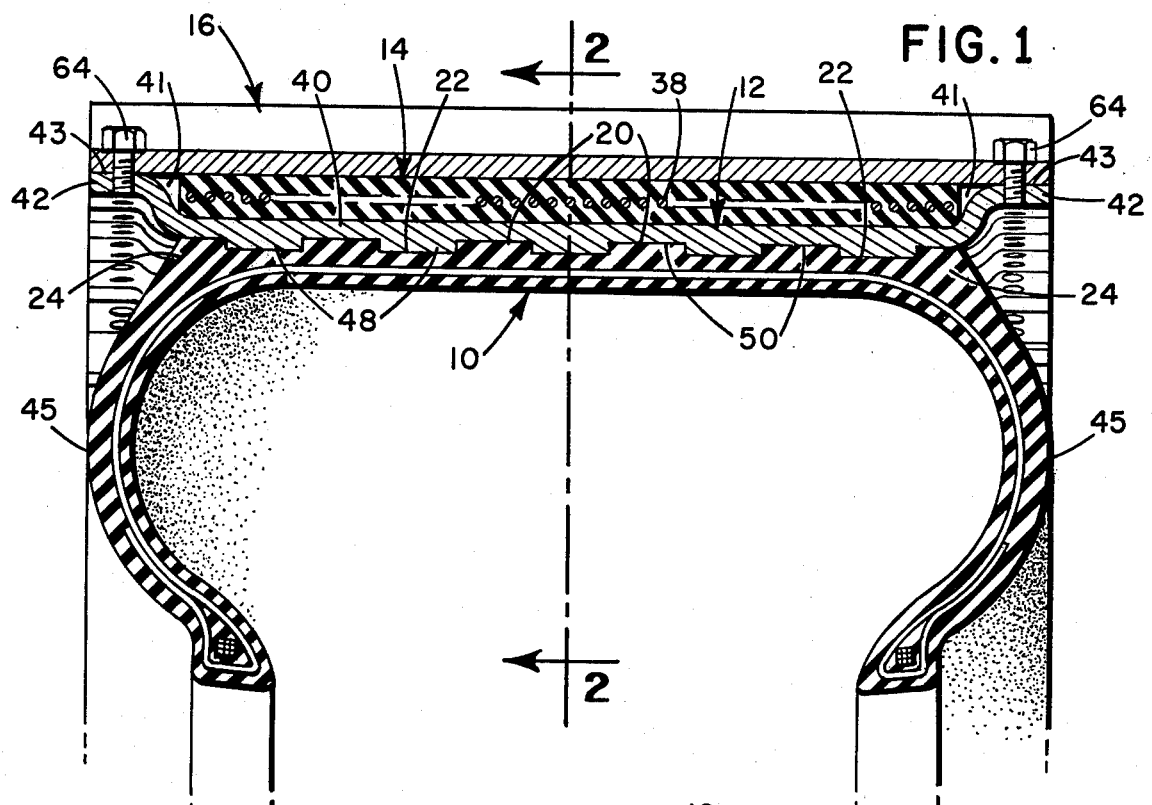
FIG. 1 is a cross-sectional view of a tire carcass, keeper bar, track belt and grouser constructed in accordance with this invention.
Figure 2:
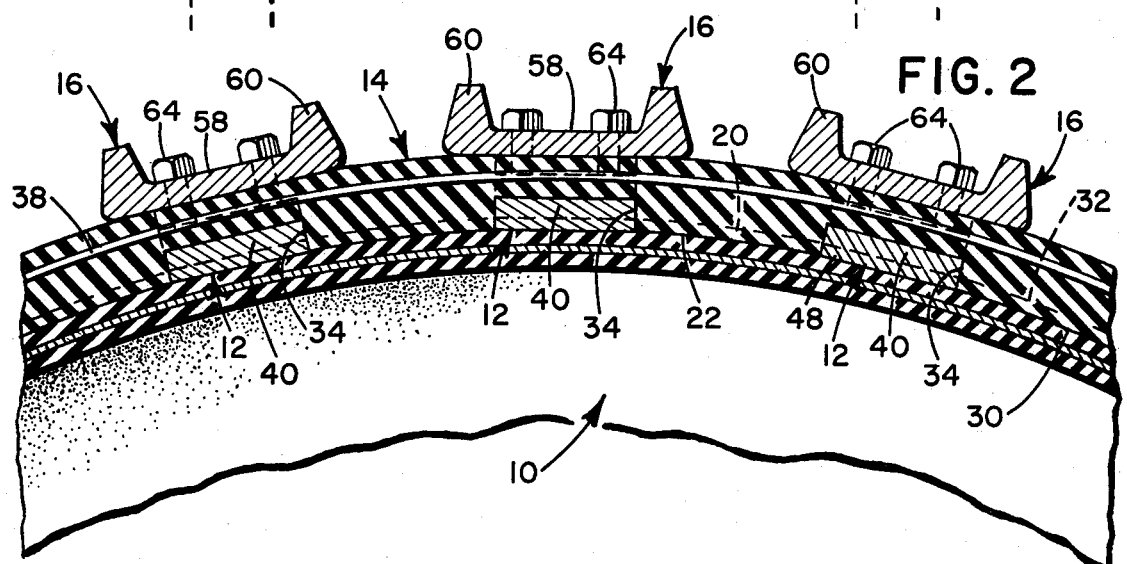
FIG. 2 is a sectional view of the contruction of FIG. 1 taken along line 2—2 of FIG. 1.

The overall arrangement of components is shown in FIG. 1, and comprises a tire carcass 10, a plurality of keeper bars 12, a removable track belt 14, and a plurality of grousers 16.

Tire carcass 10 can be of many known designs and constructions. Shown is an open tire design having an aspect ratio of about forty percent. The tire could also be of closed design. The outer circumferential surface of tire carcass 10 is provided with a plurality of circumferential lands 20 and grooves 22, culminating on each side in a carcass shoulder 24.

Figure 6:
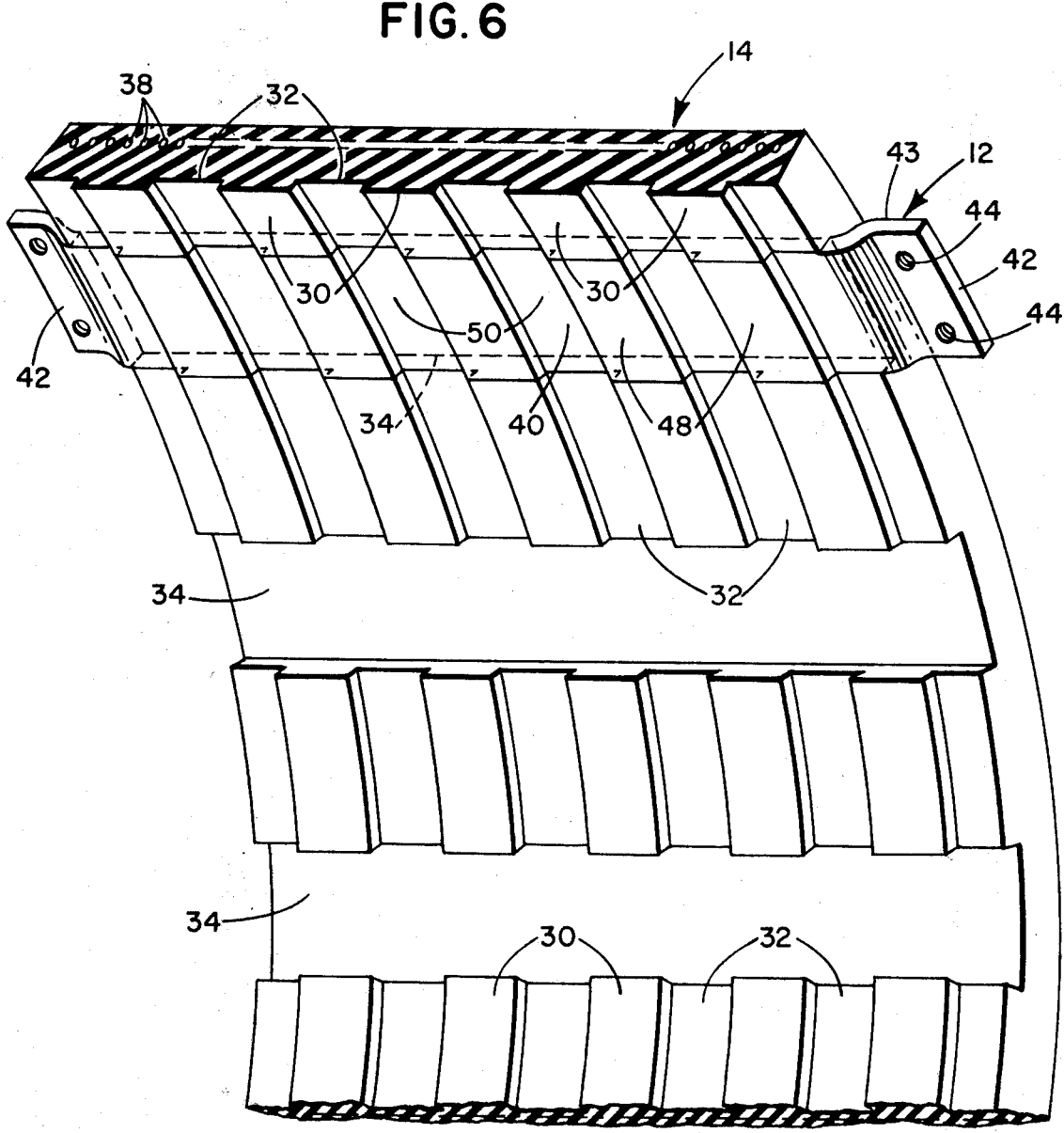
FIG. 6 is a perspective view of a portion of a removable track belt with one keeper bar installed constructed in accordance with this invention.

Track belt 14 is removable from the tire carcass. As best shown in FIG. 6, the underside, or inner circumferential surface of track belt 14 comprises a plurality of annular lands 30 and grooves 32 that mate with lands 20 and grooves 22 of tire carcass 10 to restrain belt 14 from lateral movement with respect to the carcass. The inner surface of track belt 14 also contains a plurality of axial recesses 34, which will accommodate the keeper bars 12. An inextensible belt of wires 38 is installed within the matrix of track belt 14, spaced radially outwardly of recesses 34. The axial width of track belt 14 is no less than that of the outer circumferential surface of the tire carcass.

Figure 5:
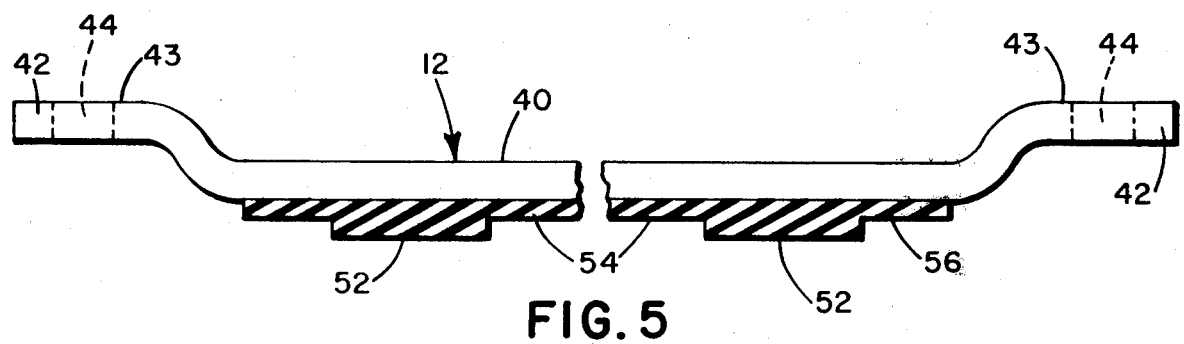
FIG. 5 is a side elevation, partially in section, of an alternative construction of a keeper bar in accordance with this invention.
Figure 4:
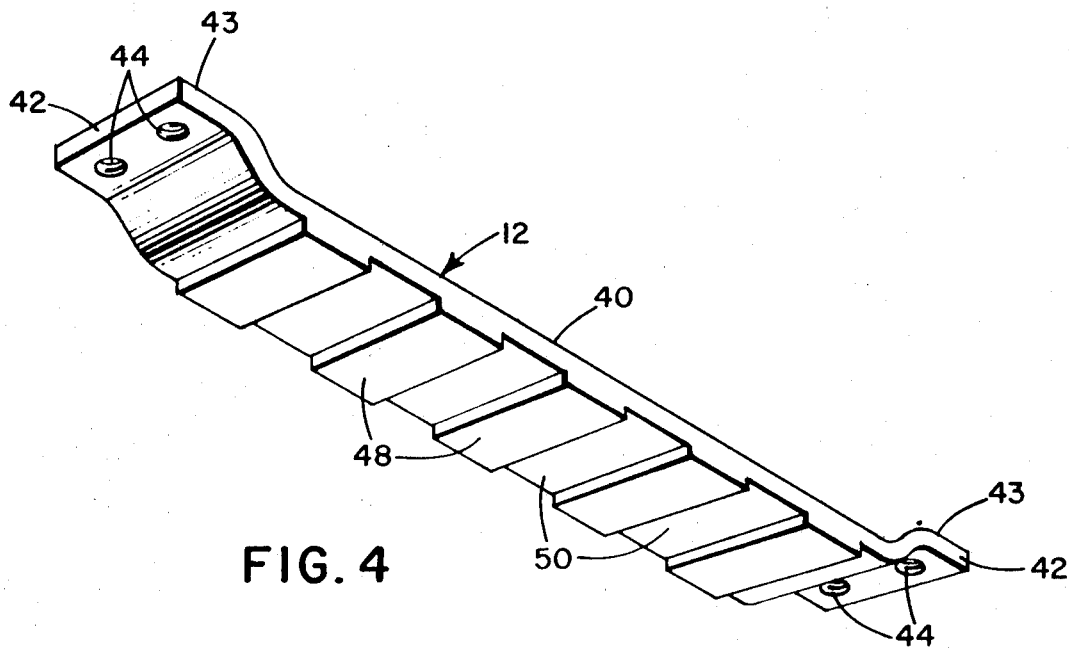
FIG. 4 is a bottom perspective view of a keeper bar constructed in accordance with this invention.

Each keeper bar 12 has a center portion 40 flanked by S-shaped end portions 42. Each end portion 42 is provided with an attachment surface 43 and means for attaching a grouser or other traction device, which may consist of a pair of threaded holes 44 for receiving bolts. The under or inside surface of center portion 40 of the keeper bar is provided with lands 48 and grooves 50 which are identical to lands 30 and grooves 32 of track belt 14. The circumferential dimension of center portion 40 is equal to that of recesses 34 in track belt 14, so that when keeper bars 12 are installed in recesses 34, a continuous pattern of lands and grooves is presented, as shown in FIG. 6. Lands 48 and/or the entire lower portion of lands 48 and grooves 50, can be integral with keeper bar 12, or they can be separate elements attached to the underside of keeper bar 12 by bonding or by interlocking means. FIG. 5 shows an arrangement wherein lands 52 and grooves 54 are part of an annular strip 56, which is attached to the underside of keeper 12 by bonding or the like. In the case of lands and/or lands and grooves being formed on a separate strip, they can be of dissimilar material, such as rubber. The axial width of center portion 40 is the same as that of track belt 14. Belt 14 is not contoured at its edges to closely fit the S-shaped portion of the keeper. A space 41 remains open, to accommodate the belt if the belt distends when a compression load is placed upon it.

Figure 8:
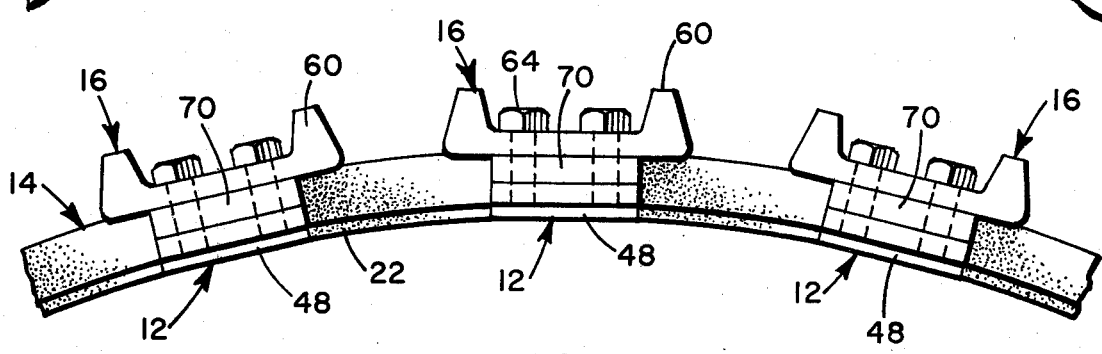
FIG. 8 is a side elevation of a portion of a removable track belt; using the construction shown in FIG. 7.
Figure 3:
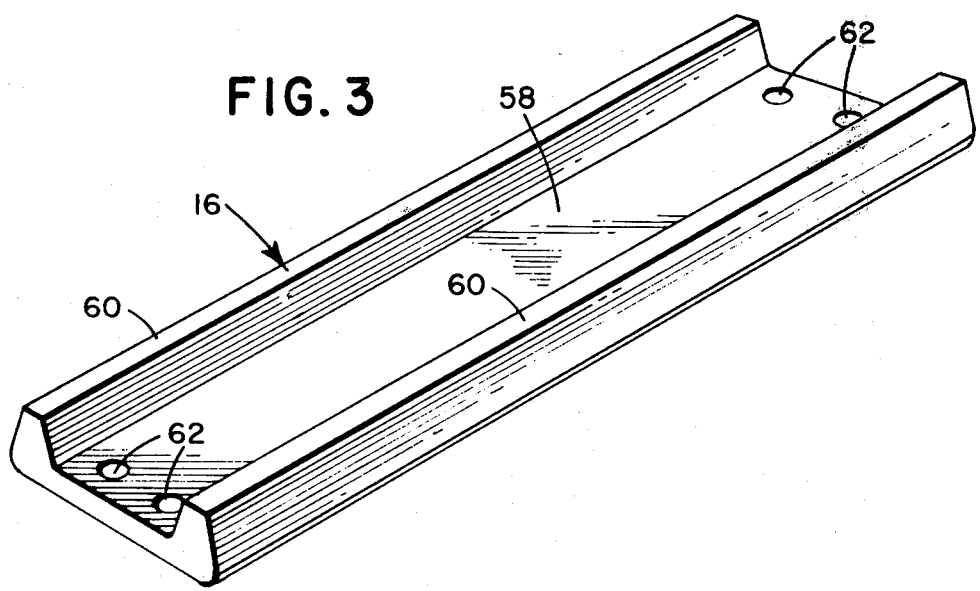
FIG. 3 is a top perspective view of a grouser bar usable with this invention.
Figure 7:
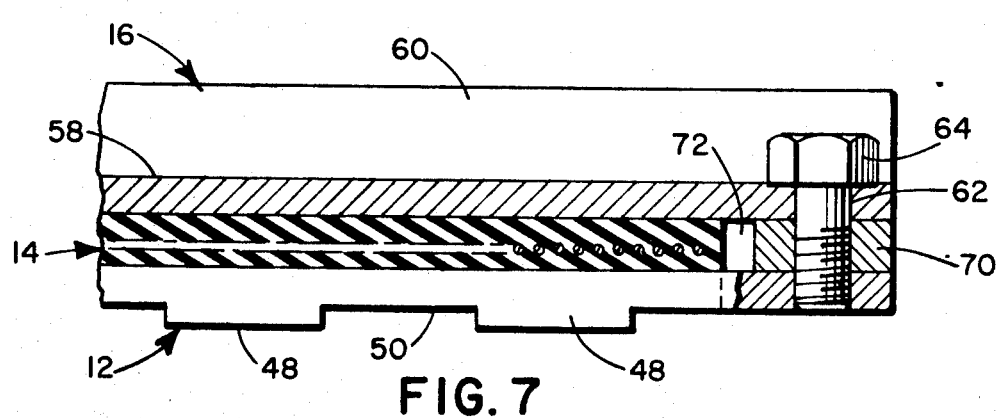
FIG. 7 is a side view partially in section of an alternative embodiment of the keeper bar.

As an alternative the end portion of keeper bars 12 can be straight, and not curved, as illustrated in FIGS. 7 and 8. In such case, a spacer 70 is interposed between bar 12 and grouser 16. Spacer 70 does not contact the edge of belt 14, but a space 72 is allowed for expansion of the belt when compressive load is placed upon it.

Grousers 16 can be of any desirable construction or material, and comprise a flat inner surface 58 which is seated on the outer surface of track belt 14, and a pair of upstanding flanges 60 on the outside surface. Openings 62 are provided for attaching the end of grouser 16 to keeper bars 12 by means of bolts 64.

The edges of keeper bar 12 and grouser 16 extend axially outwardly at least as far as the outermost point of sidewall 45, when the tire is inflated and loaded. This protects the sidewall to a great extent from damage by contact with rocks or the like. Such axial width also maximizes the size of the footprint of the tire, improving traction. Grouser 16 can extend outwardly beyond the ends of keeper bars 12, if desired, in which case the end of the keeper bars can extend outwardly a lesser distance than sidewall 43. Although the outward extension of keeper bars and grousers is shown on both sides of the tire, such can be done on one side only, if desired, or if required by restricted clearance between the inside of the tire and the vehicle.

The operation of the invention should be obvious from the above description. Keeper bars 12 are installed in recesses 34 of track belt 14. To hold keeper bars 12 in place during installation, grousers 16 are attached to the keeper bars as each is installed upon track belt 14. Then the track belt with keepers and grousers installed is placed in position around a deflated tire carcass. Inflating the carcass seats the tread belt and causes it to be held firmly in place.

Variations and modifications of the above described embodiments may become evident of those skilled in the art, and it should be understood that the breadth of the invention is limited only by the scope of the appended claims.

I claim:

1. A removable track belt assembly for installing about the circumferential surface of a tire carcass comprising:

an annular belt matrix having a plurality of spaced axially oriented recesses in the inner circumferential surface thereof and further having a first pattern of raised and lowered portions, comprising at least one raised portion or one lowered portion, on the inner circumferential surface thereof to interlock with a complementary pattern of raised and lowered portions on the outer circumferential surface of the tire carcass to prevent relative movement of said belt matrix axially with respect to said carcass;

a plurality of removable keeper bars positioned in said recesses, each of said keeper bars having an inner surface configured so as to be substantially in alignment with the inner circumferential surface of said belt matrix when said keeper bars are positioned in said recesses and further having a second pattern of raised and lowered portions, comprising at least one raised portion or one lowered portion, on the inner surface thereof to interlock with a complementary pattern of raised and lowered portions on the outer circumferential surface of the tire carcass to prevent relative movement of said keeper bars axially with respect to said carcass;

and means attached to each of said keeper bars for supplying traction to said assembly.

2. The removable track belt assembly of claim 1 wherein said first and second patterns each comprise a plurality of circumferential lands and grooves.

3. The removable track belt assembly of claim 1 wherein each of said keeper bars comprises a main portion and a strip attached to said main portion and comprising at least a portion of the inner surface of said keeper bar, said second pattern being formed at least in part on said strip.

4. The removable track belt assembly of claim 1 wherein each said keeper bar comprises a center portion flanked axially by a pair of end portions, and further comprising a radially inextensible annular belt in said belt matrix, said inextensible annular belt being located radially outwardly of said recesses and passing over said center portion of said keeper bars.

5. The removable track belt assembly of claim 4 wherein said inextensible annular belt has an axial dimension at least equal to that of the outer circumferential surface of said tire carcass.

6. The removable track belt assembly of claim 4 wherein said end portions each comprise an attachment surface for engaging said traction supplying means, said attachment surfaces being spaced radially outwardly of said center portion of said keeper bar and being substantially in alignment radially with at least portions of the circumferentially outer surface of said belt matrix, the axially inner edges of said attachment surfaces being spaced axially outwardly of the axially outer edges of said belt matrix so that a free space exists therebetween.

7. The removable track belt assembly of claim 6 wherein said end portions further comprise an S-shaped portion between said center portion and said attachment surface, said free space being between said S-shaped portion and said belt matrix.

8. The removable track belt assembly of claim 6 further comprising spacer members on said end portions and carrying said attachment surfaces, said free space being between said spacer members and said belt matrix.

9. The removable track belt assembly of claim 6 wherein said traction supplying means comprises a plurality of grousers, each grouser comprising a channel member having a pair of axially oriented upstanding flanges.

10. The removable track belt assembly of claim 1 wherein said traction supplying means comprises a plurality of grousers, each grouser comprising a channel member having a pair of axially oriented upstanding flanges.

11. The removable track belt assembly of claim 1 wherein the axial ends of each of said traction supplying means extends axially outwardly to a point at least equal to the most axially outward point on the tire carcass.

12. In combination with the removable track belt assembly of claim 1, a tire carcass comprising an outer circumferential surface having a third pattern of raised and lowered portions, comprising at least one raised portion or one lowered portion, engageable with said first and second patterns.

13. In combination with the removable track belt assembly of claim 6, a tire carcass comprising an outer circumferential surface having an axial dimension no greater than that of said inextensible annular belt.

14. The combination of claim 13 wherein said tire carcass further comprises a third pattern of raised and lowered portions, comprising at least one raised portion or one lowered portion, on the outer circumferential surface thereof engageable with said first and second patterns.

15. The combination of claim 13 wherein said tire carcass has an aspect ratio of not greater than 0.70.

16. The combination of claim 15 wherein said aspect ratio is in the range of 0.40 to 0.55.

17. The combination of claim 13 wherein said tire carcass in of radial ply construction.

18. A removable keeper bar for use with a removable tire track belt for installation upon the outer circumferential surface of a tire carcass, said track belt having an inner circumferential surface provided with a first pattern of raised and lowered portions, comprising at least one raised portion or one lowered portion, for engaging a complementary pattern on the outer circumferential surface of the tire carcass, said track belt having a plurality of recesses extending across the width thereof for receiving said keeper bars, each of said keeper bars comprising a center portion having an outer surface for seating in one of said recesses, an inner surface, and a second pattern of raised and lowered portions, comprising at least one raised portion or one lowered portion, on said inner surface engageable with a complementary pattern on the outer circumferential surface of said tire carcass.

19. The keeper bar of claim 18 further comprising a main portion and a strip attached to the inner surface of the main portion, wherein said second pattern is formed on the inner surface of said strip.

20. The keeper bar of claim 19 wherein said second pattern comprises at least one annular land and groove.

21. The keeper bar of claim 18 wherein the axial dimension of said inner surface of said keeper bar is at least equal to that of the outer circumferential surface of said tire carcass.

22. The keeper bar of claim 18 further comprising a pair of radially and axially outwardly curving S-shaped end portions flanking said center portion, each of said end portions having a surface for attachment thereto of a means for supplying traction.

23. The keeper bar of claim 18 further comprising a pair of end portions flanking said center portion, and a pair of spacer members on said end portions, each of said spacer members having a surface for attachment thereto of a means for supplying traction.

* * * * *